United States Patent [19]

Neer

[11] Patent Number: 5,222,801
[45] Date of Patent: Jun. 29, 1993

[54] AIRCRAFT READING LIGHT

[75] Inventor: Donald A. Neer, Urbana, Ohio

[73] Assignee: Grimes Aerospace Co., Urbana, Ohio

[21] Appl. No.: 803,480

[22] Filed: Dec. 2, 1991

[51] Int. Cl.[5] .................................. F29S 1/02
[52] U.S. Cl. .................................. 362/148; 362/150; 362/287; 362/372
[58] Field of Search ................. 362/62, 148, 150, 372, 362/287

[56] References Cited

U.S. PATENT DOCUMENTS

| | | | |
|---|---|---|---|
| 2,782,295 | 2/1957 | Schwenkler | 362/372 |
| 4,499,528 | 2/1985 | Hawlitzki | 362/372 |
| 5,121,303 | 6/1992 | Shirai et al. | 362/287 |

Primary Examiner—Carroll B. Dority
Attorney, Agent, or Firm—John G. Gilfillan, III

[57] ABSTRACT

A reading light, disclosed in the context of an aircraft reading light, includes a lamp which is normally selectively aimable by swiveling a mounting assembly relative to a stationary base held in a panel. A rotatable two-positioned means, such as a ring, permits such swiveling in a first position of the ring and prevents such swiveling in a second position of the ring.

5 Claims, 2 Drawing Sheets

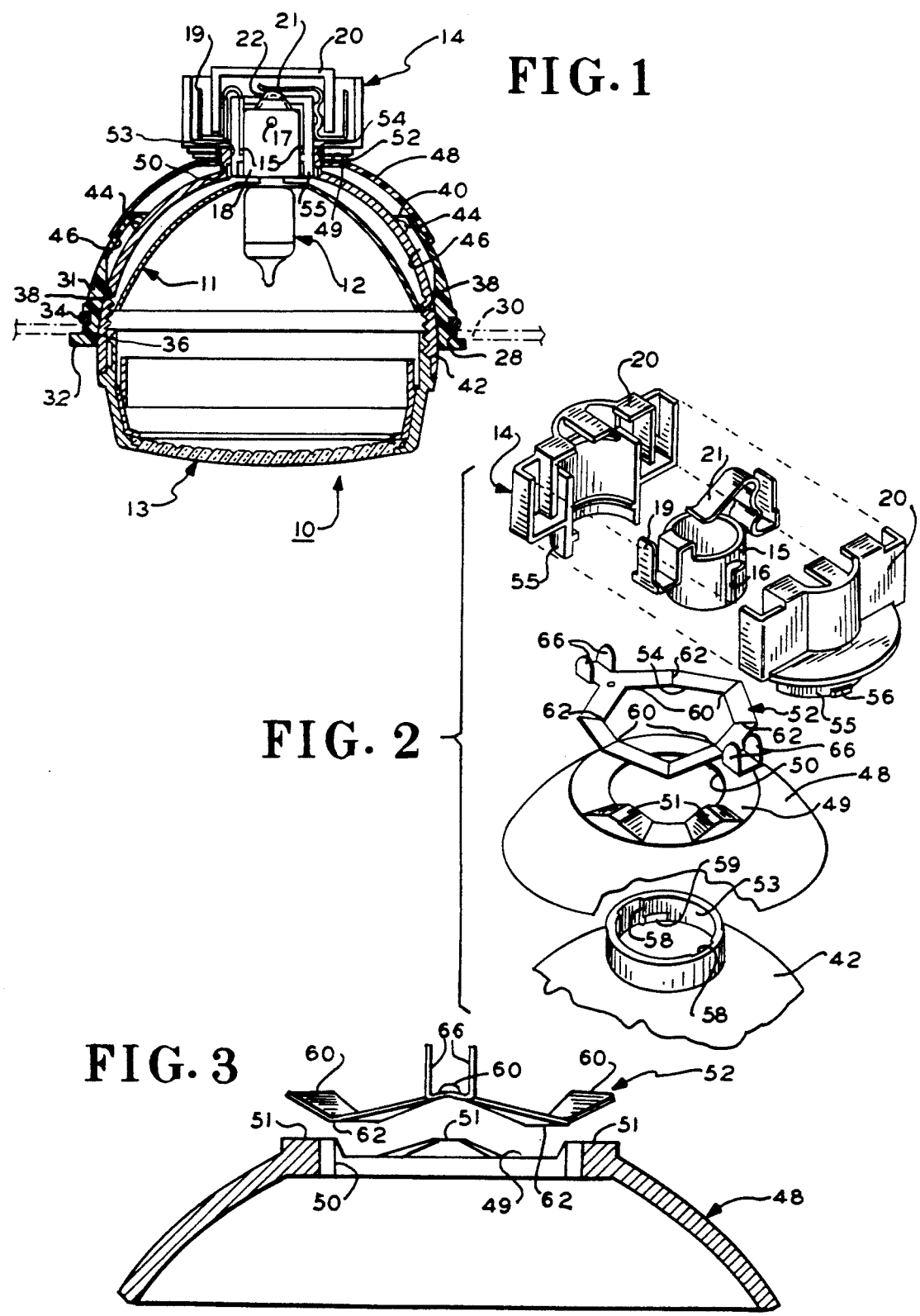

AIRCRAFT READING LIGHT

BACKGROUND

The present invention relates to an aircraft reading light, and, more specifically, to an aircraft reading light which can selectively be rendered either adjustable (and aimable) non-adjustable (and stationary).

Aircraft reading lights which are held in overhead mounts and which are aimable by passengers swiveling them in the mounts are well known. Similar overhead reading lights which are not passenger-adjustable and which are, instead, pre-aimed by airline personnel are also known.

There may be times when an airline would want overhead reading lights in aircraft to be slectively adjustable or aimable by passengers and times when the airline would want such lights to not be passenger-adjustable. Thus, it would be convenient for aircraft reading lights to be selectively adjustable or non-adjustable depending on the desires or policy of the airlines. Further, it would be desirable to be able to furnish the same light to airlines which permit passenger adjustment of lights and to airlines which do not permit passenger adjustment. An overhead reading light meeting the foregoing criteria is an object of the present invention.

SUMMARY

With the above and other objects in view the present invention contemplates a reading light having a lamp which is normally selectively aimable by swiveling a mounting assembly relative to a stationary base held in a panel. A rotatable two-position means, such as a ring, permits such swiveling in a first position of the ring and prevents such swiveling in a second position of the ring.

Preferably, the mounting assembly includes two nested dome-like members. The base is also dome-like and is interposed between the two members of the mounting assembly so that mounting the base to panel mounts the reading light. On the inside of the base is a rectangular depression in which rides a projection which is formed on the outside of the inner nested member of the mounting assembly and which normally sets the limits of swivelling. Rotation of the ring, which is trapped between the outer nested member of the mounting assembly and a portion of the mounting assembly which mounts the lamp, moves the projections into interfering abutment with the depression to prevent swivelling.

BRIEF DESCRIPTION OF THE DRAWING

FIG. 1 is a sectioned elevation of a reading light according to the present invention;

FIG. 2 is an exploded view which shows the relationship of certain elements of the reading light of FIG. 1 according to the present invention;

FIG. 3 is a partially sectioned elevation which depicts the interrelation between a retainer and a washer, two elements of the reading light of FIGS. 1 and 2;

DETAILED DESCRIPTION

Figure 4:
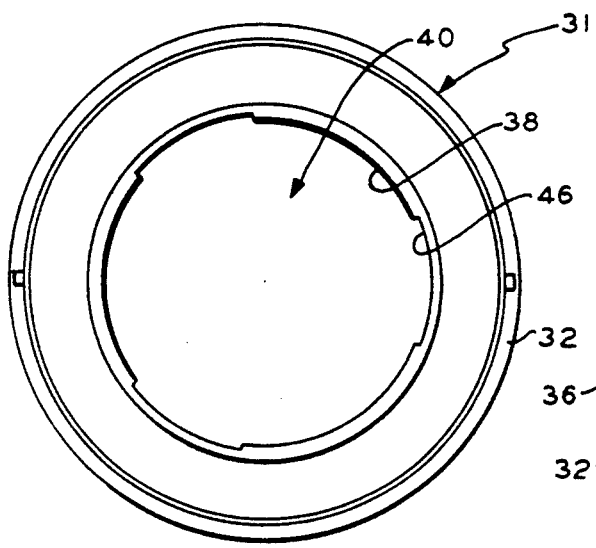
FIGS. 4–6 are, respectively, a plan view, a sectioned side elevation, and a bottom view of a base having closed depressions for constraining motion of housing of the reading light of FIGS. 1 and 2.
Figure 5:
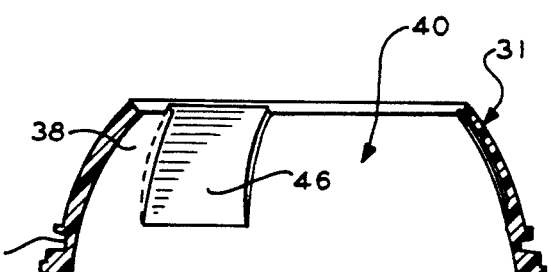
Figure 6:
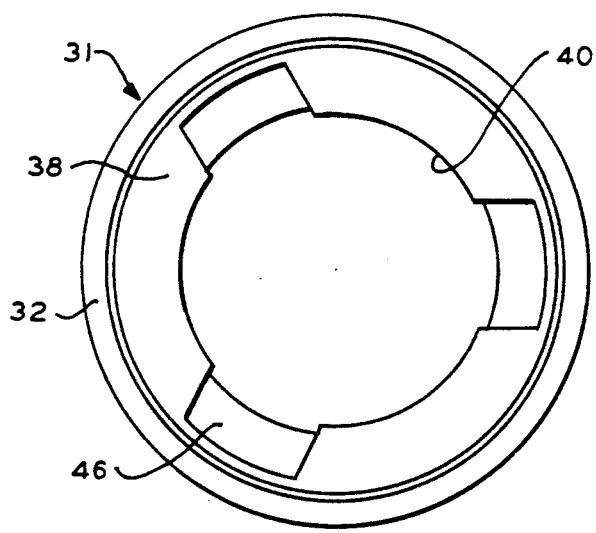

Referring first to FIGS. 1 and 2, an aircraft passenger reading light 10 is shown according to the invention.

The reading light 10 includes a reflector, 11, a lamp 12 and a lens 13. The lamp 12, which is preferably of the bayonet, quartz halogen type, is mechanically mounted by and electrically connected to a lampholder 14.

The lampholder 14 includes an electrically conductive cylinder 15 having a compound slot 16 therein for retaining a bayonet pin 17 on the base 18 of the lamp 12. The lamp holder 14 also includes a first contact 19 integral with the cylinder 15 for providing an electrical connection to the base 18 of the lamp 12 from one side of an external power source (not shown). The lampholder 14 also includes in a non-conductive, preferably molded plastic cap 20 which also houses a second electrical contact 21. The contact 21 is electrically engagable by a terminal 22 on the bottom of the lamp 12 which is connectable to the other side of the the power source (not shown) so that the lamp 12 may be energized and illuminated.

The reading light 10 is intended to be mounted within and to extend through an aperture 28 formed in an overhead panel 30 located in the passenger space of an aircraft. A dome-like base 31 which mounts the other elements of the reading light 10 is inserted through the aperture 28 until an integral flange 32 abuts the exterior underside of the panel 30. Thereafter, a split mounting ring 34 is inserted into an annular groove 36 in the exterior of the base 31, thereby trapping the panel 30 between the ring 34 and the flange 32 and, stationarily mounting the base 31 to the panel 30. The base 31, as shown in FIGS. 1 and 4–6, is preferably made of molded plastic and has an interior chamber 38 and an upper opening 40 communicating with the chamber 38 and located opposite the flange 32. The chamber 38 receives a dome-like, molded plastic housing 42, a portion of which protrudes out of the opening 40.

Figure 7:
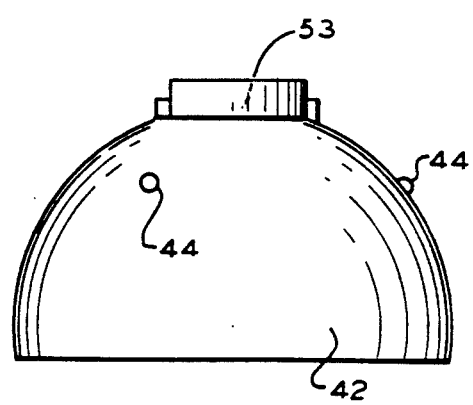
FIG. 7 is a front elevation of a housing of athe reading light of FIG. 1 and 2 which shows raised projections that contact the closed depressions in the base of FIGS. 4–6.

The housing 42 has a plurality of integral external surface features 44, such as three raised projections or dimples illustrated in FIGS. 1 and 7. The projections 44 travel and ride within a plurality of generally rectangular depressions or grooves 46 formed in the inner surface of the chamber 38 of the base 31. The depressions 46 permit the housing 42 to be angularly and rotationally moved or swiveled a limited amount relative to the stationary base 31. Abutment of the projections 44 with bottom and side edges of the depressions 46, and simultaneous movement of the projections 44 to near the tops of the depressions 46, where the distances between the projections 44 equals the distance between the depressions 46 define the limits within which the projections 44 may travel.

As shown in FIGS. 1 and 2, a molded plastic retainer 48 is positioned above and on the outside of the upper exterior portion of the base 31. The retainer 48 has a domed shape so that it may rest upon the base 31 and move or swivel together with the housing 42 relative to the stationary base 31. The top of the retainer 48, as illustrated in FIG. 2, forms an annular surface 49 surrounding an aperture 50 which communicates with the interior of the retainer 48. Surrounding the aperture 50 and formed on the otherwise flat surface 49, are a plurality of raised features 51, such as the mesas shown in FIGS. 2 and 3. Although four mesas 51 are preferred, only two are visible in FIG. 2 and only three are shown in the Sectioned elevation of FIG. 3.

As shown in FIGS. 1-3, a metal washer 52, which is selectively movable between two rotational positions generally relative to the axes of the openings 40 and 50, is situated atop the flat surface 49 of the retainer 48. The centerlines of a central opening 53 in the housing 42, the aperture 50 in the retainer 48, and an aperture 54 in the washer 52 are all generally coincident. The cap 20 of the lampholder 14 is positioned above the washer 52. A cylindrical collar 55 on the cap 20 is inserted through the aperture 53 of the housing 42. One or more raised lips 56 on the cylindrical collar 55 of the cap 20 are thereby positioned within matching longitudinal slots 58 formed in the wall of the opening 53 of the housing 42. Upon longitudinal movement of the cap 20 relative to the housing 42, the raised lips 56 move along the slots 58, until they are aligned with circumferential extension 59 of the slots 58. Rotation of the housing 42 rotates the lips 56 into the circumferential extensions 59 (FIG. 2) thereby locking the light assembly 10 together, as shown in FIG. 1. The entire assembly may normally be adjusted or swiveled with the base 31 remaining stationary in the panel 30 as described above.

Referring to FIGS. 1-3, the washer 52 surrounds the opening 53 in the housing 42 and is loosely trapped between the bottom of the cap 20 and the surface, 49 of the retainer 48. The washer 52 has a sinuous surface including a plurality of elevated crests 60 alternating with depressions 62. Preferably, there are four crests 60 and depressions 62. Manually engageable tabs 66 are formed on the washer 52 to permit maintenance personnel or others who are able to gain access to the normally inaccessible interior of the panel 30 to rotationally adjust the washer 52 between a first position rendering the light 10 non-adjustable and a second position permitting user adjustment of the light 10.

In the second position of the light which allows user adjustment, the crests 60 overlie the mesas 50 and the depressions 62 overlie the surface 49 on the retainer 48. The light 10 is permitted to be adjusted by swiveling the housing 42 as described above. To render the light 10 non-adjustable, the washer 52 is rotated to the first position in which the crests 60 reside rest on the mesas 50 of the retainer 48. This positioning of the washer 52 increases the height crests 60 above the surface 49 and the effective thickness of the washer 52 to move the cap 20 away from the retainer 48. Movement of the cap 20 away from the retainer 48, also moves the housing 42 upwardly toward the retainer 48 due to the above described cap-housing 20, 42 connection 56, 58. Such movement of the housing 42 moves it upwardly relative to the base 31, which, in turn causes the projections 44 in housing 42 to move toward the uppermost edge 68 of the depressions 46 in the base 40. This position of the projections 44, shown in FIG. 1, prevents swivelling movement of the housing 42 relative to the base 31. That is, the housing 42 and the cap 20 cannot swivel, because the housing 42 is locked between the crests 60, which have elevated the cap 20 and the housing, and the projection-depression 44, 46 interface. The foregoing thereby disables the ability to swivel the housing 42 with respect to the base 31.

Those skilled in the art will appreciate that modifications to the above may be made without departing from the spirit or scope of the following claims.

We claim:

1. An improved reading light of the type having a lamp held in a mounting assembly, the lamp being selectively aimable swivelling the mounting assembly relative to a base assembly which retains the mounting assembly and which mounts the reading light to a panel, such relative swivelling occurring generally about an axis of the base assembly, wherein the improvement comprises:
    two-position means selectively, rotatable generally about the axis of the base assembly between a first and second position for permitting such relative swivelling in its first position and for preventing such relative movement in its second position.

2. A reading light as in claim 1, wherein:
    the selectively rotatable means includes a member which in the first rotatable position does not affect clearance between the base assembly and the mounting assembly and in the second position eliminates such clearance, the mounting assembly being swivelable when the clearance is present and being not swivelable when the clearance is not present.

3. A reading light as in claim 2, wherein:
    the mounting assembly includes:
        a bulb mount;
        a dome-like housing attached to the bulb mount, and
        a dome-like retainer held between the bulb mount and the dome-like housing and overlying a portion of the housing;
    the base assembly, includes:
        a dome-like base, a portion of which overlies a first portion of the housing which is not overlain by the retainer and a portion of which overlies a second portion of the housing and underlies a portion of the retainer, the housing being movable relative to the base assembly; and
    the selectively rotatable means comprises:
        a ring rotatably surrounding the attachment between the housing and the bulb mount and being interposed between the bulb mount and the retainer;
        rotatable movement of the ring into the first position decreasing the distance between the bulb mount and the retainer to permit free swivelling of the mounting assembly relative to the base assembly rotatable movement of the ring into the second position increasing the distance between the bulb mount and the retainer to prevent free swivelling of the mounting assembly relative to the base assembly and the bulb mount.

4. A reading light as in claim 3, wherein:
    the housing includes a projection, and
    the base assembly includes a depression in which the projection resides, the depression delineating the limits of swivelling when the ring is in the first position, the projection being interfered with by the depression when the ring is in the second position, such interference preventing swivelling of the mounting assembly.

5. A reading light as in claim 1, wherein:
    the mounting assembly includes a pair of nested dome-like members, and the base assembly includes a dome-like member partially interposed between the nested members of the mounting assembly, the dome-like member of the base assembly being stationary, the members of the mounting assembly being swivelable relative to the base assembly, there normally being, in the first position of the rotatable means, clearance between one of the nested members and the base member, rotation of the rotatable means, to the second position moving the one nested member and the base assembly together so that there is no clearance to swivel.

* * * * *